(12) United States Patent
Duncan et al.

(10) Patent No.: US 10,938,761 B2
(45) Date of Patent: *Mar. 2, 2021

(54) FORWARDING MESSAGES IN A WIRELESS COMMUNICATIONS NETWORK

(71) Applicant: INTERNATIONAL BUSINESS MACHINES CORPORATION, Armonk, NY (US)

(72) Inventors: Michael E. Duncan, St. Neots (GB); Fabien Florek, Bratislava (SK); Andrew M. Lees, Corfe Mullen (GB); Joe D. S. Pavitt, Chandler's Ford (GB); Adriana Tudela Longas, London (GB)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/813,258

(22) Filed: Nov. 15, 2017

(65) Prior Publication Data

US 2018/0376519 A1    Dec. 27, 2018

Related U.S. Application Data

(63) Continuation of application No. 15/628,683, filed on Jun. 21, 2017.

(51) Int. Cl.
*H04L 12/58* (2006.01)
*H04L 29/06* (2006.01)
*H04L 29/08* (2006.01)

(52) U.S. Cl.
CPC .............. *H04L 51/14* (2013.01); *H04L 51/20* (2013.01); *H04L 65/1096* (2013.01); *H04L 67/18* (2013.01)

(58) Field of Classification Search
CPC .............. H04W 76/14; H04W 72/048; H04W 52/0126; H04W 40/00; H04W 12/00503;
(Continued)

(56) References Cited

U.S. PATENT DOCUMENTS 5,541,976 A  *  7/1996  Ghisler ................. H04W 68/00
                                                    455/426.1
6,701,145 B2    3/2004  Payne et al.
(Continued)

OTHER PUBLICATIONS

IBM: List of IBM Patents or Patent Applications Treated as Related (Appendix P), Jan. 15, 2018, 2 pages.
(Continued)

*Primary Examiner* — Lance Leonard Barry
(74) *Attorney, Agent, or Firm* — Teddi E. Maranzano

(57) ABSTRACT

Handling communications in a wireless network is described. A message requesting forwarding of communications for a first user device is received. Communications include telephone calls, video calls, text based communications, and messages sent via social media. The message requesting forwarding is sent in response to detecting a battery reaching or dropping below a predefined threshold power level. The location of the first user device is determined. One or more trusted second user devices associated with the first user device is identified based on a parameter indicating a highest predefined priority. A trusted second user device is selected to automatically receive redirected forwarded communications for the first user device. The selected second user device is located within a predefined distance of the location of the first user device. Forwarding is cancelled based on detection of normal battery status, or upon receiving a manual cancellation notification.

8 Claims, 6 Drawing Sheets

(58) Field of Classification Search
CPC ............ H04W 12/08; H04W 12/0804; H04W 12/00506; H04L 47/10; H04L 45/30; H04L 5/003; H04L 12/5855; H04L 51/14; H04L 29/0638; H04L 65/1096; H04L 51/20; H04L 67/18; H04M 2203/2083; H04M 3/58; H04M 2203/2094; H04M 2242/30; H04M 3/42263
See application file for complete search history.

(56) References Cited

U.S. PATENT DOCUMENTS

| | | | |
|---|---|---|---|
| 6,912,384 B2 | 6/2005 | Huomo et al. | |
| 7,440,440 B1* | 10/2008 | Abichandani | H04M 3/42212 370/351 |
| 7,657,273 B2 | 2/2010 | Haartsen | |
| 7,890,090 B2 | 2/2011 | Hansen et al. | |
| 8,893,247 B1* | 11/2014 | Faaborg | G06F 21/6245 726/7 |
| 9,049,293 B2* | 6/2015 | Chavez | H04M 3/42348 |
| 9,078,078 B1* | 7/2015 | Fine | H04W 4/16 |
| 9,094,519 B1* | 7/2015 | Shuman | H04M 3/54 |
| 9,426,031 B2 | 8/2016 | Baribault et al. | |
| 9,578,177 B2* | 2/2017 | Barkan | H04M 3/42212 |
| 9,723,461 B2* | 8/2017 | Govande | H04M 3/54 |
| 2006/0111136 A1 | 5/2006 | Song | |
| 2007/0287438 A1* | 12/2007 | Hansen | H04M 3/54 455/417 |
| 2008/0112364 A1* | 5/2008 | Kwon | H04W 84/20 370/331 |
| 2009/0280817 A1* | 11/2009 | Chavez | H04M 3/54 455/445 |
| 2010/0030858 A1* | 2/2010 | Chasin | G06Q 10/107 709/206 |
| 2010/0255880 A1* | 10/2010 | Huang | H04W 4/16 455/558 |
| 2011/0093546 A1* | 4/2011 | Rubingh | G06Q 10/107 709/206 |
| 2013/0210393 A1* | 8/2013 | Hillier | H04W 4/021 455/413 |
| 2014/0065997 A1* | 3/2014 | Walker | H04W 4/90 455/404.1 |

OTHER PUBLICATIONS

Pending U.S. Appl. No. 15/905,879, filed Feb. 27, 2018 entitled: "Communication Handling in a Wireless Communications Network", 30 pages.
List of IBM Patents or Patent Applications Treated as Related. Filed Feb. 27, 2018. 2 pages.
Bohon, "5 hidden iOS 8 features that all Apple users should know" Learn about the hidden features in iOS 8 that you'll have a hard time living without . . . once you find out about them., Apple, Sep. 17, 2014, 12 pages.
Makvana, "5 of the Best Call Forwarder Apps for Android", maketecheasier, Nov. 21, 2014, 10 pages.
Elcock, Techjunkie, "Best Call Forwarding Apps for Android", Tech, https://www.techjunkie.com, May 21, 2017, 10 pages.
Ooma Telo Support, "Call Forwarding and Multi-Ring", http://support.ooma.com/home/call-forwarding-and-multiring, Accessed on May 31, 2017, 3 pages.
Luis D., "How to automatically message your contacts before your battery completely runs out", Phonearena, posted Jul. 24, 2014, 6 pages.
Disclosed Anonymously, "Battery signal broadcast on outgoing request", An IP.com Prior Art Database Technical Disclosure, IP.com No. IPCOM000207852D, IP.com Electronic Publication Date: Jun. 14, 2011, 3 pages.
Lenovo et al., "Dying gasp communication for smart device.", An IP.com Prior Art Database Technical Disclosure, Original Publication Date: Jan. 6, 2014, IP.com No. IPCOM000233993D, IP.com Electronic Publication Date Jan. 6, 2014, 2 pages.
Disclosed Anonymously, "Mobile device status sent by server", An IP.com Prior Art Database Technical Disclosure, IP.com No. IPCOM000236905D, IP.com Electronic Publication Date: May 21, 2014, 2 pages.
Disclosed Anonymously, "Automatic transfer of mobile phone calls on low battery", An IP.com Prior Art Database Technical Disclosure, IP.com No. IPCOM000238452D, IP.com Electronic Publication Date: Aug. 27, 2014, 2 pages.
Kelly, "Phone lost, battery dead? Lookout Mobile knows when and where it died", venturebeat, Oct. 9, 2015, 8 pages.
Quint, "The Cure for a Dying Phone", A new app lets you forward your calls and texts, Purewow, Tech, Jan. 16, 2015, 4 pages.
Pending U.S. Appl. No. 15/628,683, filed Jun. 21, 2017, entitled: "Communication Handling in a Wireless Communications Network", 33 pages.

* cited by examiner

FORWARDING MESSAGES IN A WIRELESS COMMUNICATIONS NETWORK

BACKGROUND

The present disclosure relates to wireless communications, and, more specifically, to the handling of communications in a wireless communications network.

SUMMARY

According to an aspect of the present disclosure, a computer implemented method is provided. A message requesting forwarding of communications for a first user device is received. A location of the first user device is determined. One or more second user devices associated with the first user device are identified. A second user device is selected to receive forwarded communications for the first user device. The selected second user device is located within a predefined distance of the location of the first user device.

According to another aspect of the present disclosure, a system is provided. The system comprises a network switching subsystem for a wireless communications service provider. The network switching subsystem comprises a processing unit. The processing unit receives a message from a first user device requesting forwarding of communications for the first user device. The processing unit further determines a location of the first user device. The processing unit identifies one or more second user devices associated with the first user device. The processing unit selects a second user device to receive forwarded communications for the first user device. The selected second user device is located within a predefined distance of the location of the first user device.

According to yet another aspect of the present disclosure, a computer program product is provided. The computer program product comprises a computer readable storage medium having program instructions embodied therewith. The program instructions are executable by a processor to cause the processor to: receive a message requesting forwarding of communications for a first user device; determine a location of the first user device; identify one or more second user devices associated with the first user device, and select a second user device to receive forwarded communications for the first user device. The selected second user device is located within a predefined distance of the location of the first user device.

According to a further aspect of the present disclosure, a device is provided. The device comprises a user device for wireless communication. The user device comprises a communication forwarding subsystem. The communication forwarding subsystem detects a predefined condition requiring communication forwarding. The communication forwarding subsystem sends a message to a wireless communications service provider, the message requesting forwarding of communications for the user device. The communication forwarding subsystem is embedded with an operating system of the user device. In example implementations of the device in accordance with this aspect, the communication forwarding subsystem may provide an alert to a user, when the device receives a message requesting communication forwarding for a specified user device. The alert may enable the user to accept or request communication forwarding for the specified user device. The communication forwarding subsystem may determine whether the request for communication forwarding has been accepted by the user within a predetermined time interval. The communication forwarding subsystem may send an acceptance message or a rejection message based on the determination.

BRIEF DESCRIPTION OF THE SEVERAL VIEWS OF THE DRAWINGS

Example implementations of the present disclosure will be described below with reference to the following drawings, in which.

DETAILED DESCRIPTION

The following detailed description sets out example implementations, which include specific implementation details, in order to provide the reader with a thorough understanding of the present disclosure. The skilled person will appreciate that the present disclosure is not limited to such implementation details but encompasses all suitable equivalents and alternative implementations within the scope thereof.

Mobile user devices such as mobile phones, personal digital assistants (PDAs), portable computers such as tablets, notebooks and laptops and the like, rely on battery power for sending and receiving communications over a wireless communications network such as a cellphone or wireless local area network (WLAN) network. When the battery of a mobile device runs out of power, the user is unable to receive communications over the wireless network. Whilst users typically attempt to recharge the batteries of their mobile devices to avoid such power loss, this is not always possible, for example, when the user has little time or opportunity to do so or is in a location where battery recharging facilities are not available.

The present disclosure relates to systems, methods and computer program products for handling communications for a mobile user device, when the mobile device is running out of battery power. In example implementations of the present disclosure, communications are forwarded to a selected user device. In other example implementations, senders of communications to the mobile device are notified of communication forwarding to a selected user device. The user device may be selected from a set of trusted user devices associated with the mobile device that is running out of battery power. The selected user device is within the vicinity of the mobile device that is running out of power. Example implementations of the present disclosure may handle communications to a mobile user device, including audio and audio/video communications (e.g., telephone and video calls) and text based communications (e.g., SMS messages, email messages, messages sent via social media and instant messaging applications and the like). In the following description, references to "communications" should be understood as encompassing all such user communications, including automated communications, consistent with application and/or user requirements.

Figure 1:
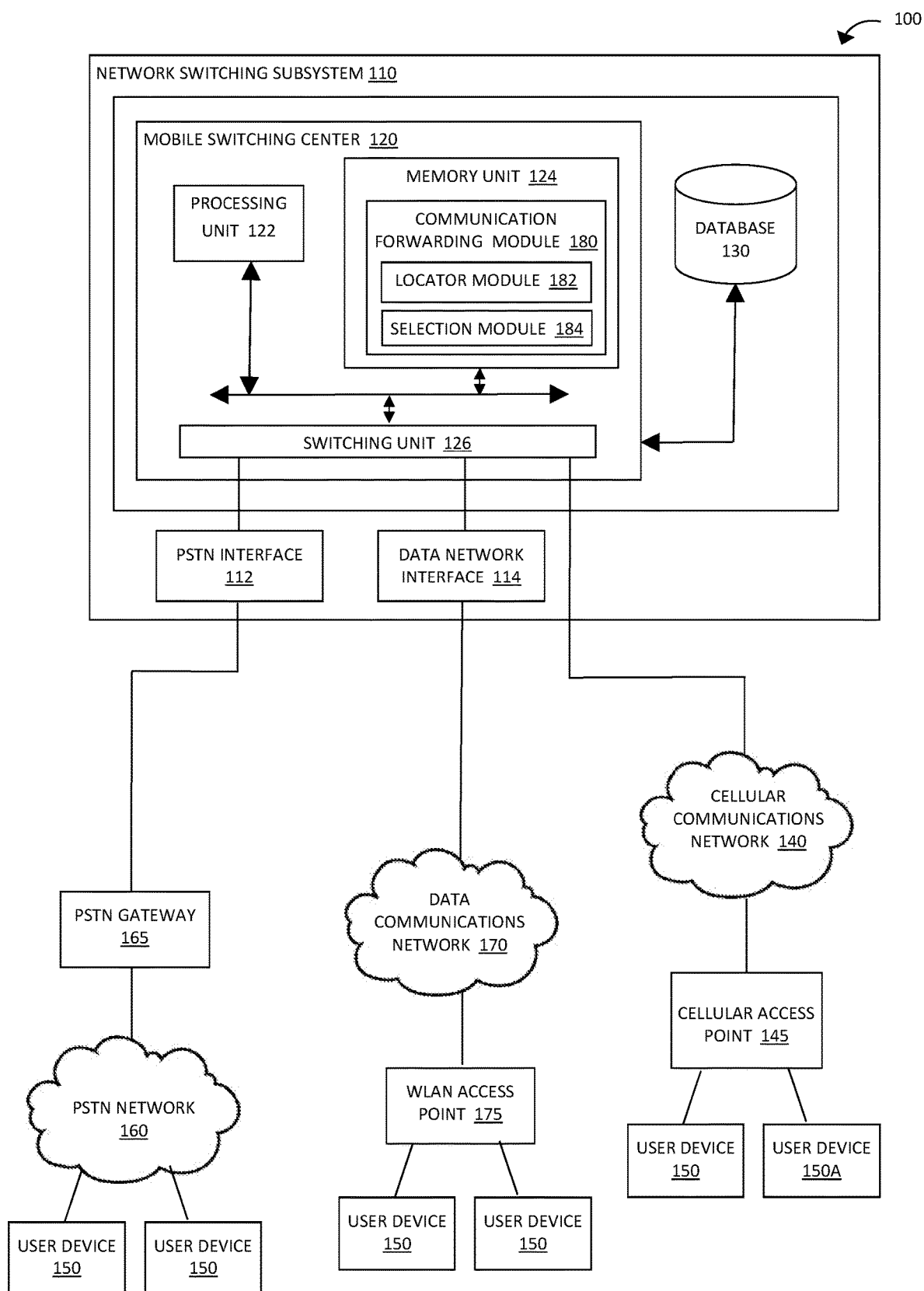
FIG. 1 is a block diagram of a system for communication forwarding in accordance with example implementations of the present disclosure.

FIG. 1 is a block diagram of a system 100 for communication forwarding in accordance with example implementations of the present disclosure. System 100 comprises a network switching subsystem 110 of a wireless communications service provider. In accordance with example implementations of the present disclosure, network switching subsystem 110 routes communications between user devices 150 over a cellular communications network 140 comprising cellular access points 145 (e.g., base stations). In particular, network switching subsystem 110 includes a mobile switching center 120 comprising processing unit 122, memory unit 124 and switching unit 126. Network switching subsystem 110 further comprises databases 130, which store data relating to user devices 150 and corresponding users of the services of the wireless communications service provider. As the skilled person will appreciate, databases 130 may be distributed, and thus located remotely from, but accessible to, network switching subsystem 110.

Network switching subsystem 110 may be connected to one or more other networks, for switching communications between user devices 150 connected to cellular communications network 140 to user devices 150 connected to one or more other networks 160, 170. In accordance with example implementations shown in FIG. 1, network switching subsystem 110 comprises a public switched phone network (PSTN) interface 112 connected to the PSTN network 160 via PSTN gateway 165, and a data network interface 114 connected to a data communications network 170 (e.g., LAN, WAN or the Internet). As the skilled person will appreciate, network switching subsystem 110 may be connected to other voice and/or data communications networks by corresponding interfaces, which provide for communication in accordance with the corresponding network communications protocol.

In accordance with example implementations of the present disclosure, mobile switching center 120 forwards communications, in response to a communication forwarding request from a mobile user device 150A subscribed to the services of the wireless communications service provider. For example, the mobile device 150A may send a communication forwarding request message to the mobile switching center 120 over cellular communications network 140 via a cellular access point 145 or over data communications network 170 via a WLAN access point 175.

In the example implementations shown in FIG. 1, memory unit 124 of mobile switching center 120 includes a communication forwarding module 180. Communication forwarding module 180 may comprise program instructions (i.e., program code) for execution by processing unit 122 for communication forwarding, in response to a communication forwarding request message from mobile device 150A. In particular, communication forwarding module 180 may comprise a locator module 182 and a selection module 184. Locator module 182 may obtain location information for user devices 150, including the mobile device 150A, by accessing databases 130 and/or location information contained in communications between user devices 150. Selection module 184 may select a trusted user device 150 to receive forwarded communications. Further details of the method for communication forwarding performed by communication forwarding module 180, in accordance with example implementations of the present disclosure, are provided below with reference to FIGS. 2 and 3.

Figure 2:
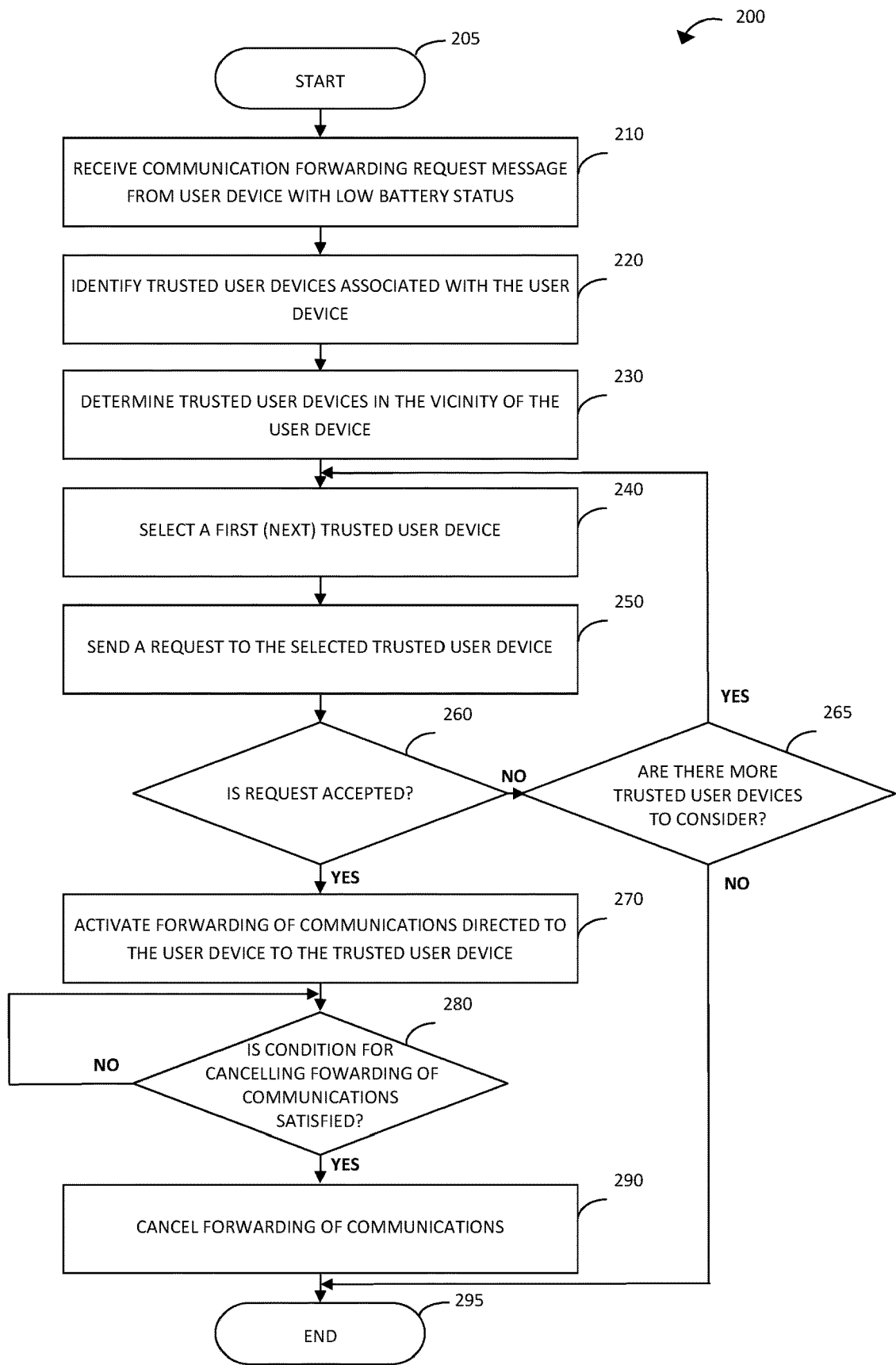
FIG. 2 is a flowchart of a method for communication forwarding in accordance with example implementations of the present disclosure.

FIG. 2 is a flowchart of a method 200 for communication forwarding in accordance with example implementations of the present disclosure. The method 200 may be performed in a system or device associated with a wireless communications service provider, such as the network switching subsystem 110 of FIG. 1. In particular, in example implementations of the present disclosure, the method 200 may be performed by communication forwarding module 180 in memory unit 124 of the mobile switching center 120, as described above with reference to FIG. 1.

The method 200 starts at step 205. At step 210, the method receives a communication forwarding request message from a user device. The communication forwarding request message (herein called "request message") may be received from a mobile user device in response to the detection of a predefined condition of the user device, such as low battery status, or otherwise according to application and/or user requirements. The request message may include user data associated with the user device and/or location information, as described below.

At step 220, the method identifies a set of trusted user devices associated with the user device. In particular, the method may identify one or more user devices that are indicated as "trusted" by the user of the user device. The set of trusted user devices may be identified based on user data associated with the user device. Such user data may be received in the request message, obtained by exchange of further messages with the user device, obtained from a backup storage device or otherwise. Each user device in the set of trusted user devices may include an identifier, such as the user name, network address, telephone number or other data that uniquely identifies the trusted user device. Such identifiers may be obtained from an address book or contact list included in the user data associated with the user device. Alternatively, identifiers may be obtained from user data, such as an address book or contact list, associated with a social media, email or other account of the user of the user device.

At step 230 the method determines the trusted user devices that are located within the vicinity of the user device. In particular, the step 230 may determine, from the identified set of trusted user devices, a subset of trusted user devices that are located within a predetermined distance of the user device. Step 230 may use the method described below with reference to FIG. 3, to determine the trusted user devices that are located within the vicinity of the user device.

At step 240, the method selects a first trusted user device in the vicinity of the user device. Step 240 may select the trusted user device based on a parameter associated with the priority thereof. In example implementations of the present disclosure, step 240 may select the trusted user device that is located closest to the user device as the highest priority. In other example implementations, step 240 may select the trusted user device based on a priority value predefined by the user. In still further example implementations, step 240 may select the trusted user device based on communication history with the user device. For example, step 240 may select, as the highest priority, the trusted user device that had the most recent communication with the user device, the trusted user device having the longest history of communication with the user device or the trusted user device having the highest frequency of communication with the user device over a recent time period, or any combination thereof. As the skilled person will appreciate, other methods for selecting a trusted user device, according to a predefined priority based on a parameter thereof, are possible and contemplated by the present disclosure.

At step 250, the method sends a message requesting forwarding of communications to the trusted user device selected in step 240. In particular, step 250 may send a message to the selected trusted user device comprising an invitation to the user to accept or reject communication forwarding for the user device. The message may include the name of the user of the user device or otherwise identify the user device seeking communication forwarding. Further details of the message sent to the trusted user device are provided below with reference to FIG. 4.

At step 260, the method determines whether the request for communication forwarding has been accepted by the trusted user device. For example, step 260 may determine whether an acceptance message has been received from the trusted user device, in response to the request message, after a predetermined time interval. If step 260 determines that the request for communication forwarding has not been accepted by the trusted user device, the method continues with step 265. Step 260 may determine that the request for communication forwarding has not been accepted by the trusted user device when no response has been received after the predetermined time interval or when a rejection message is received from the trusted user device in response to the request.

At step 265, the method considers whether there are further trusted user devices to consider. In particular, step 265 may consider whether there are further trusted user devices in the subset of trusted user devices, in the vicinity of the user device, determined in step 230. If step 265 determines that there are further trusted user devices to consider, the method returns to step 240 which selects the next trusted user device, based on priority. The method then continues in a loop from step 240 through step 260, for the selected next trusted user device. When step 265 determines that there are no further trusted user devices to consider, then communication forwarding is not possible and the method ends at step 295.

Returning to step 260, if step 260 determines that the request for communication forwarding has been accepted by the trusted user device, the method continues with step 270. At step 270, the method activates forwarding of communications directed to the user device to the trusted user device. Optionally, step 270 may initially send an acceptance message to the user device seeking confirmation that communication forwarding to the trusted user device should be activated, and await confirmation from the user device prior to activating communication forwarding. In example implementations of the present disclosure, step 270 may activate communication forwarding by automatically redirecting communications, including messages and calls, to the trusted user device. In other example implementations, step 270 may provide a response message to the sender of the communication to the user device, providing details of communication forwarding to the trusted user device. For example, the response message to the sender may indicate that communication forwarding is activated and provide an identifier of the trusted user device so that the sender may communicate directly with the trusted user device. As the skilled person will appreciate, other techniques for activating communication forwarding are possible and contemplated by the present disclosure.

At step 280, the method may determine whether a condition for cancelling communication forwarding is satisfied. In particular, step 280 may be performed continuously, at periodic intervals or otherwise according to application and/or user requirements. Any suitable conditions may be used for cancelling communication forwarding. In example implementations of the present disclosure, the condition may be detection of normal wireless communications from the user device. In other example implementations, the condition may be the receipt of a communication forwarding cancellation message. A communication forwarding cancellation message may be received from the user device, for example following detection of a normal battery status or from the trusted user device, for example following a manual indication from the user thereof that forwarding of communications is no longer desired or possible. As the skilled person will appreciate, other conditions for cancelling communication forwarding are possible and contemplated by the present disclosure.

If step 280 determines that a condition for cancelling communication forwarding is not satisfied, the method repeats step 280 as described above. However, if step 280 determines that a condition for cancelling communication forwarding is satisfied, the method continues to step 290, which cancels communication forwarding for the user device. Optionally, step 290 may send confirmation of the cancellation of communication forwarding to the user device and/or the trusted user device, according to application and/or user requirements. The method then ends at step 295.

As the skilled person will appreciate, the method 200 of FIG. 2 may be implemented by a communication forwarding module 180 as described above with reference to FIG. 1. In this case, locator module 182 of communication forwarding module 180 may perform step 230 and selection module 184 of communication forwarding module 180 may perform one or more of steps 240 through 265. As the skilled person will appreciate, other implementations of the method 200 of FIG. 2 are possible and contemplated by the present disclosure.

Figure 3:
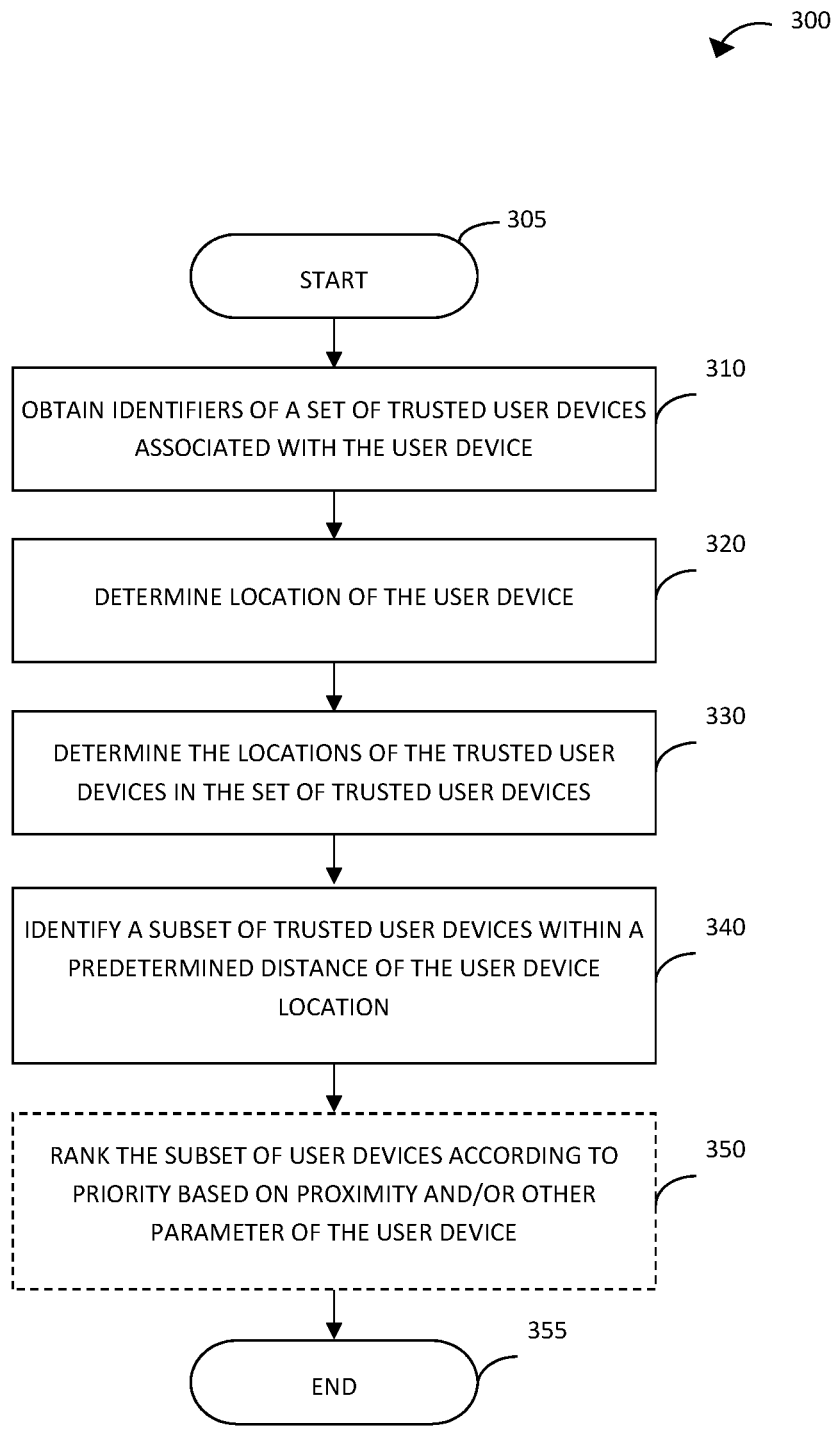
FIG. 3 is a flowchart of a method for identifying trusted user devices for receiving forwarded communications in accordance with example implementations of the present disclosure.

FIG. 3 is a flowchart of a method 300 for identifying trusted user devices for receiving forwarded communications in accordance with example implementations of the present disclosure. In particular, the method 300 may be performed in step 230 of the method 200 of FIG. 2 described above.

The method 300 starts at step 305. For example, the method may start at step 305 in response to receiving a communication forwarding request message from a user device, as in step 210 of the method 200 of FIG. 2, or otherwise.

At step 310, the method obtains identifiers of a set of trusted user devices associated with the user device seeking communication forwarding. In particular, step 310 may extract user data associated with the user device from the received communication forwarding request message, or may obtain the user data, for example from the user device or otherwise. Step 310 may obtain identifiers for the trusted user devices, such as user name, network address, telephone number or other identifier that uniquely identifies each trusted user device, from the user data associated with the user device. As described above, trusted user devices may be identified as "trusted" by the user in the user data of the user device, such as an address book or contacts list.

At step 320, the method determines the location of the user device. In particular, step 320 determines the current location of the user device. As the skilled person will appreciate, the term "current location" of a user device refers to a determined location of the user device within a short time before, as well as at, the current point in time. The location of the user device may be determined using any suitable technique. In example implementations of the present disclosure, step 320 may obtain global navigation satellite system (GNSS) data (e.g., GPS data) for the user device. GNSS data may be included in the communication forwarding request message, by means of a suitable location tracking application in the user device. In other example implementations, step 320 may obtain location data for the user device by triangulation using wireless signals associated with the user device. As the skilled person will appreciate, other suitable techniques for determining the location of the user device, whether now known or developed in the future, are possible and contemplated by the present disclosure.

At step 330, the method determines the location of the trusted user devices. In particular, step 330 may attempt to determine the current location of each trusted user device in the set of trusted user devices using the identifiers obtained in step 310. Step 330 may use any suitable technique for determining the current location of each trusted user device using the corresponding identifier. As the skilled person will appreciate, it may not be possible to obtain location information for every trusted user device, for example because the trusted user device is switched off or location information is unavailable. Accordingly, only the trusted user devices for which step 330 is able to determine the location, become candidates for communication forwarding in subsequent steps of the method 300.

At step 340, the method identifies a subset of the trusted user devices that are in the vicinity of the user device. In particular, step 340 may identify a subset of trusted user devices within a predetermined distance of the location of the user device. In example implementations of the present disclosure, step 340 may determine a distance between the location of each trusted user device (as determined in step 330) and the location of the user device (as determined in step 320), and compare the distance with a predetermined threshold. Step 340 may determine that a trusted user device is in the vicinity of the user device if the determined distance, between the trusted user device and the user device, is less than or equal to the threshold distance. The threshold distance may be a predefined distance, which may be specified by an application developer or product vendor and may be configurable by the user, corresponding to a distance that is sufficiently close to the user device for messages to be passed between the respective users, in person (e.g., 10-100 meters).

At optional step 350, the method may rank the trusted user devices within the subset identified in step 340, according to a predefined priority. In particular, step 350 may rank the trusted user devices of the subset based on proximity to the user device, with the trusted device closest to the user device having the highest priority. In addition, or alternatively, step 350 may rank the trusted user devices of the subset according to a priority based on another parameter thereof. In example implementations of the present disclosure, step 350 may rank the trusted user devices of the subset based on a priority value predefined by the user. In other example implementations, step 350 may rank the trusted user devices of the subset based on communication history with the user device. For example, step 250 may rank, as the highest priority, the trusted user device that had the most recent communication with the user device, the trusted user device having the longest history of communication with the user device or the trusted user device having the highest frequency of communication with the user device over a recent time period, or any combination thereof. As the skilled person will appreciate, other methods for ranking the trusted user devices of the subset, according to a predefined priority based on a parameter thereof, are possible and contemplated by the present disclosure.

The method then ends at step 355. For example, step 355 may output the (optionally ranked) subset of trusted user devices for use in step 240 of the method 200 of FIG. 2. As the skilled person will appreciate, in the case that step 355 outputs a ranked subset of trusted user devices, step 240 of the method 200 of FIG. 2 may select the trusted user devices in rank order.

As the skilled person will appreciate, the method 300 of FIG. 3 may be modified to include additional filtering steps, to further reduce the number of candidate trusted user devices in the ranked subset provided in step 350. For example, an additional step may be included to determine the trusted user devices that are currently in communication with a relevant wireless communications network and thus available to receive forwarded communications. Any suitable technique for identifying the availability of trusted user devices is possible and contemplated by the present disclosure. In another example, trusted user devices that have not had been involved in recent communications with the user device in a certain time period (e.g., 1 day) may be excluded from the candidate trusted user devices used in step 330 or step 340.

Figure 4:
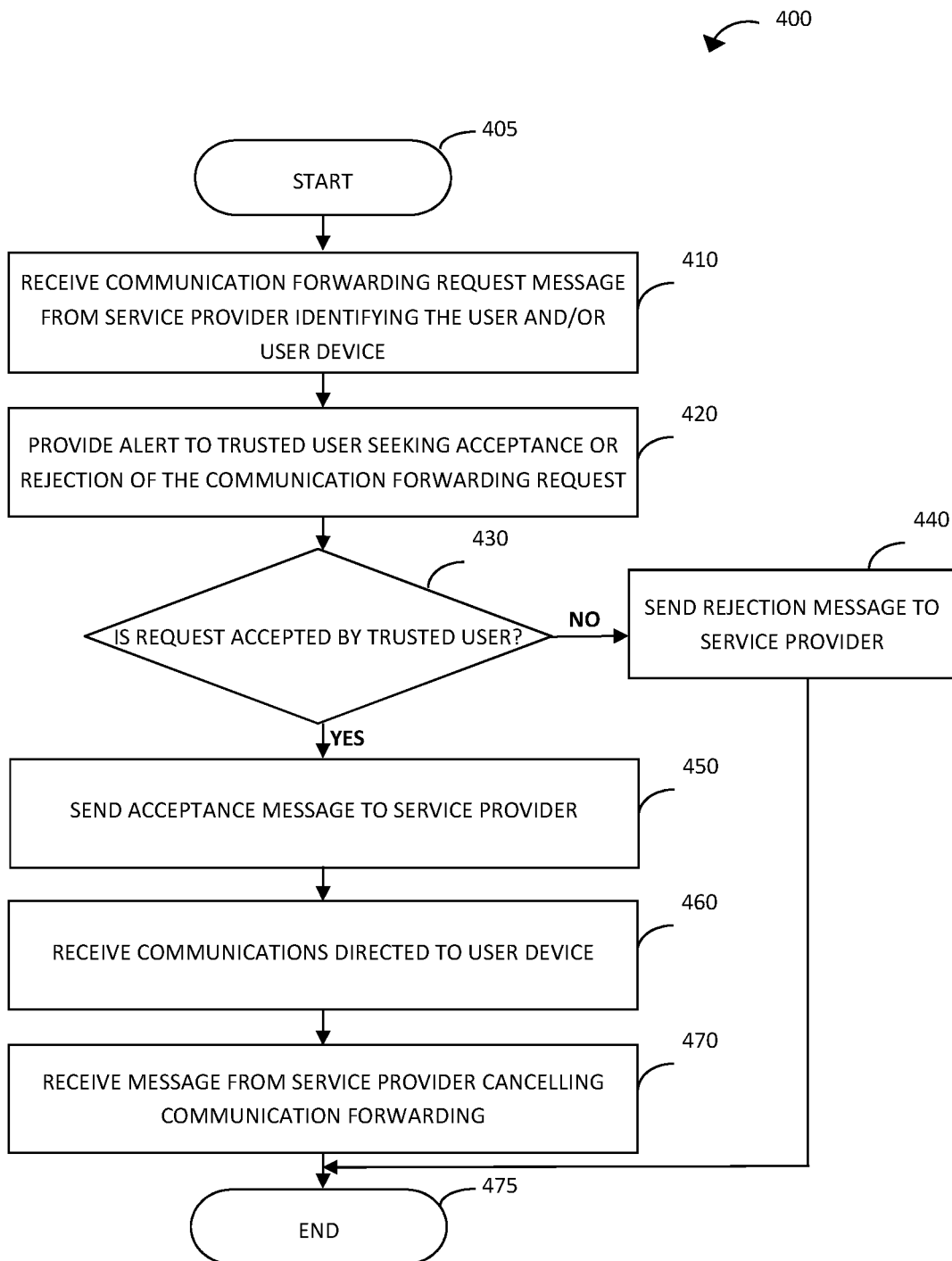
FIG. 4 is a flowchart of a method for communication forwarding in a trusted user device in accordance with example implementations of the present disclosure.

FIG. 4 is a flowchart of a method 400 for communication forwarding in a trusted user device in accordance with example implementations of the present disclosure. In particular, the method 400 may be performed by a trusted user device that receives a communication forwarding request message from a wireless communications service provider, such as in step 250 of the method 200 of FIG. 2 as described above.

The method 400 starts at step 405. At step 410 the method receives a message requesting communication forwarding for a user device from a wireless communications service provider. The message may identify the user and/or user device, for example by include the name of the user, and/or an address and/or number identifying the user device, seeking communication forwarding. In particular, step 410 may receive a message comprising an invitation to the user of the trusted user device to accept or reject communication forwarding for a specified user device. In accordance with example implementations of the present disclosure, the message may be received as an operating system or application notification, or as an SMS message, email message or other text based message, providing the user with the ability to reply by accepting or rejecting the request as described below. In other example implementations, the message may be received as a telephone call having a pre-recorded audio message. As the skilled person will appreciate, other techniques for receiving a message requesting communication forwarding are possible and contemplated by the present disclosure.

At step 420, the method provides an alert to the user of the trusted device, seeking acceptance or rejection of the request for communication forwarding. Step 420 may use any suitable technique for alerting the trusted user of the message, and for enabling the trusted user to accept or reject communication forwarding for the user device. In example implementations of the present disclosure, step 420 may display a message on the display screen of the trusted user device, optionally accompanied by an audio alert, providing the user with options to accept or reject the request, by pressing a button on the keypad or tapping an icon on a touch-sensitive display screen thereof. In example implementations, in which the message is received as a telephone call, step 420 may play an audio message on the speaker of the trusted user device and provide the user with options to accept or reject the request, for example by pressing a button on the keypad, by speaking and answer (e.g., "yes" or "no") into the microphone, or otherwise.

At step 430, the method determines whether the request for communication forwarding has been accepted by the user of the trusted device. Step 430 may determine whether the request has been accepted after a predetermined time interval. If step 430 determines that the request has not been accepted by the user, the method proceeds to step 440. Step 430 may determine that the request has not been accepted by the user of the trusted user device when no response has been received after the predetermined time interval or when the user responds by rejecting the request. At step 440, the method sends a rejection message to the wireless communications service provider, in response to the invitation, and the method then ends at step 475. However, if step 430 determines that the request has been accepted by the user, the method proceeds to step 450.

At step 450, the method sends an acceptance message to the wireless communications service provider, in response to the invitation. As described above with reference to FIG. 2, the wireless communications service provider may activate forwarding of communications directed to the user device to the trusted user device, in response to receiving the acceptance message. Accordingly, at step 460, the method receives forwarded communications directed to the user device. The forwarded communications may be highlighted to indicate that they are provided as part of a communication forwarding service. Any suitable technique for highlighting the communications is possible and contemplated by the present disclosure. For example, a forwarded text-based message may be prefixed with a message to indicate that it is a forwarded message, for example "FW: Intended for Person A-". In other examples, the message may be presented differently on the display of the trusted user device, for instance by the viewing application, such as SMS reader, instant messaging application, etc. For instance, the message may be displayed in a different font, color or size of text, or may include a symbol indicating a forwarded message.

At step 470, the method receives a message from the wireless communications service provider cancelling communication forwarding, thereby notifying the user of the trusted user device that no further forwarded communications will be received. The method then ends at step 475.

Figure 5:
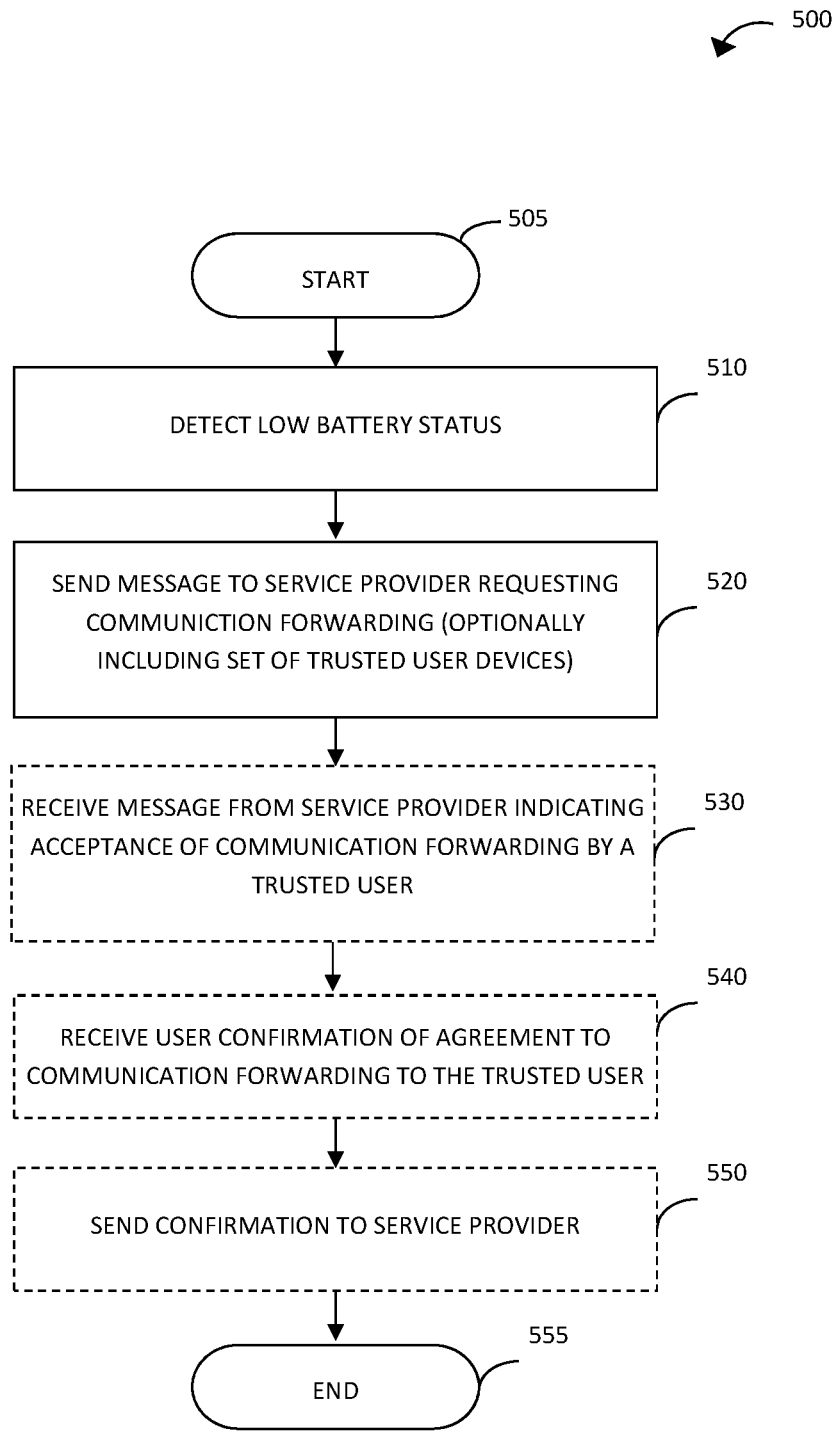
FIG. 5 is a flowchart of a method for establishing communication forwarding for a user device in accordance with example implementations of the present disclosure.

FIG. 5 is a flowchart of a method 500 for establishing communication forwarding for a user device in accordance with example implementations of the present disclosure. In particular, the method 500 may be performed by a mobile user device seeking communication forwarding by a wireless communications service provider, for example in conjunction with the methods of FIGS. 2, 3 and 4 as described above. The method 500 may be implemented in a mobile user device as part of the same processing module or subsystem used to implement the method 400 of FIG. 4 when the mobile user device is a selected trusted user device, as described above.

The method starts at step 505. At step 510, the method detects a low battery status of the user device. As the skilled person will appreciate, a mobile user device typically monitors the status of its battery for a battery status indicator. In accordance with example implementations of the present disclosure, step 510 may determine a low battery status when the battery reaches or drops below a predefined threshold level for use in triggering an option for communication forwarding. The predefined threshold battery level may be selected so that there is sufficient power remaining to allow at least a communication forwarding request message to be sent by the user device, and, preferably, also a communication forwarding acceptance message to be received from a wireless communications provider, as discussed below. The threshold battery level is typically specified by an application developer or product vendor, but may be configurable by a user according to application and/or user requirements.

At step 520, the method sends a communication forwarding request message to a wireless communications service provider. The communication forwarding request message may correspond to the request message received by the wireless communications service provider in step 210 of the method 200 of FIG. 2, as described above.

At optional step 530, the method may receive a message from the wireless communication server provider indicating acceptance of communication forwarding by a trusted user and, optionally, seeking confirmation from the user. In particular, the acceptance message may identify the trusted user device, for example by indicating the name of the associated trusted user or otherwise, and seek confirmation from the user that communication forwarding should be activated.

At further optional step 540, the method may receive confirmation of agreement by the user to communication forwarding to the trusted user device. For example, the user may indicate confirmation of agreement to communication forwarding to the trusted user device by pressing a key on the keypad, or touching an icon displayed on a touch-sensitive display, of the user device. At optional step 550, the method may send a confirmation message to the wireless communications service provider, confirming agreement to communication forwarding. The method then ends at step 555. As the skilled person will appreciate, the wireless communications service provider may then activate communication forwarding, for example as in step 270 of the method 200 of FIG. 2.

In the example implementations of the method 500 of FIG. 5, detection of a low battery status is used as the trigger for the communication forwarding process. As the skilled person will appreciate, in other example implementations detection of other conditions for starting the communication forwarding process are possible and contemplated. Other conditions may include detection of a manual request for communication forwarding by the user of the user device, detection of low credit associated with the user device or some other relevant condition for which communication forwarding may be desirable.

The methods for communication forwarding, in accordance with the above described example implementations, include steps for seeking permission for, and/or confirmation of agreement to, communication forwarding prior to activation of communication forwarding, and thus rerouting of communications. This ensures that users are aware and agree to communication forwarding in advance. As the skilled person will appreciate, in some circumstances, one or more of these steps may be omitted and/or automatic assumptions of permission or agreement may be made. For example, an automatic assumption of user agreement may be made based on predefined user settings, previous agreement to communication forwarding between the relevant users, and the like.

Figure 6:
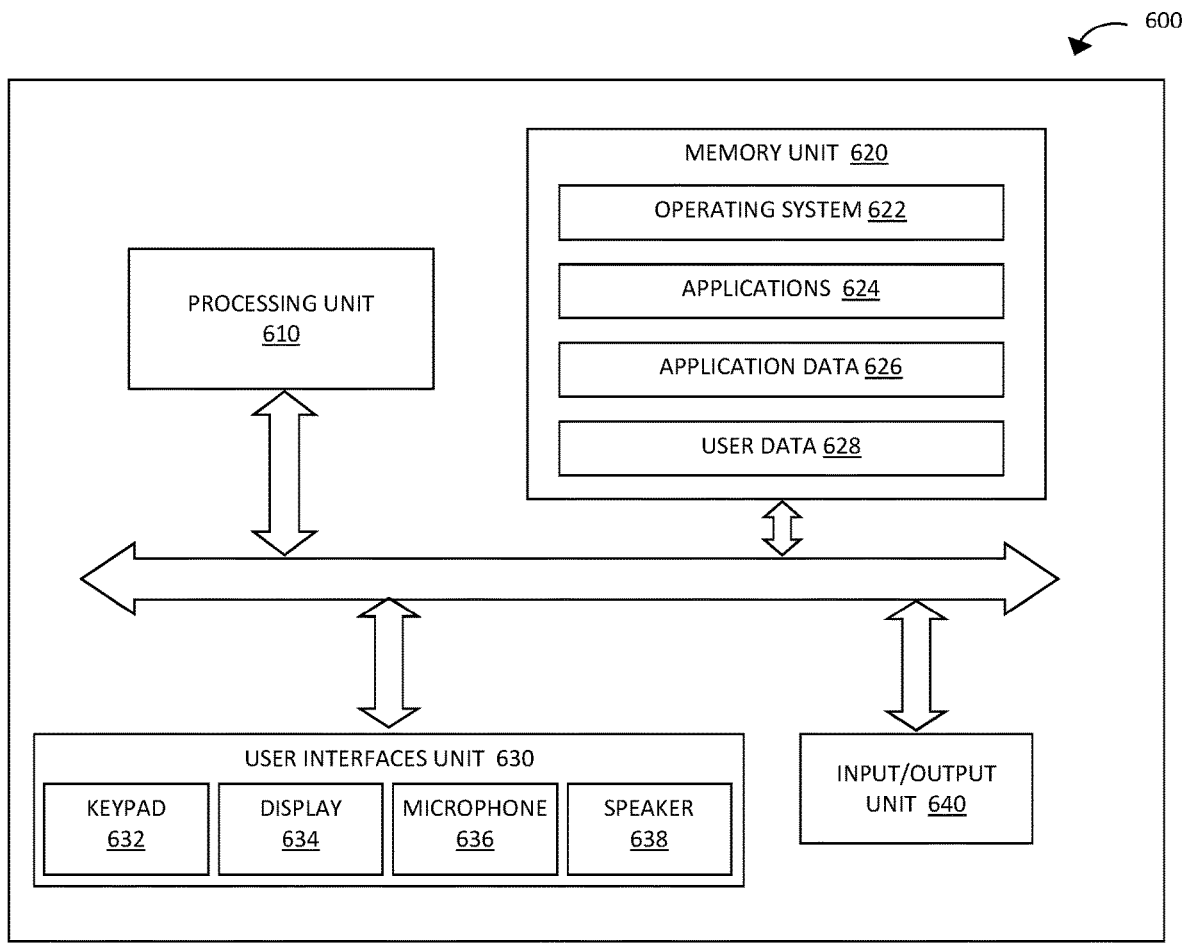
FIG. 6 is a block diagram of a user device in accordance with example implementations of the present disclosure.

FIG. 6 is a block diagram of a mobile user device 600 in accordance with example implementations of the present disclosure. In particular, the mobile device 600 may implement the method 500 of FIG. 5, for communication forwarding, as described above.

Mobile device 600 may comprise any type of portable user device configured for communication over one or more wireless communications networks. In accordance with example implementations of the present disclosure, mobile device 600 may comprise a mobile phone, PDA, tablet, notebook or other portable computer capable of communication over a wireless communications network, such as a cellular communications network, a WLAN or the like. As shown in FIG. 6, mobile device 600 comprises a processing unit 610, a memory unit 620, a plurality of user interfaces 630 and an input/output (I/O) unit 640. Memory unit 620 typically comprises subsystems and modules for implementing the functional operations of mobile device 600, and memory unit 620 stores associated data. In particular, memory unit 620 generally comprises an operating system 622, a plurality of applications 624, application data 626 and user data 628. Operating system 622 of mobile device 600 may comprise any suitable mobile operating system, whether now known or developed in the future, such as iOS developed by Apple Inc. of Cupertino, Calif. and Android developed by Google Inc. of Mountain View, Calif. The plurality of user interfaces 630 may include a keypad 632, a display 634 (which may be a touch sensitive display), a microphone 636 and a speaker 638.

I/O unit 640 comprises an interface for communication with external devices over one or more wireless communications networks. In particular, I/O unit 640 may include one or communications subsystems, each comprising a wireless transceiver for communication in accordance with a corresponding network communication protocol.

In accordance with example implementations of the present disclosure, processing unit 610 executes program instructions of operating system 622 and one or more of the plurality of applications 624 based on application data 626 and/or user data 628, including data from communications from external devices received via I/O unit 640. In accordance with example implementations of the present disclosure, operating system 622 may comprise program instructions (i.e., program code) embedded therein for performing processes for communication forwarding in the mobile device 600, such as the method 400 of FIG. 4 and/or the method 500 of FIG. 5, as described above. By embedding the communication forwarding subsystem or module in the operating system 622, the communication forwarding process, such as the methods of FIGS. 4 and 5, may be performed consistently and independently of an application 624 selected for sending and receiving communications by the mobile device 600. As the skilled person will appreciate, in other examples implementations, program instructions of one or more applications 624 may be provided for performing processes for communication forwarding in the mobile device 600.

Figure 7:
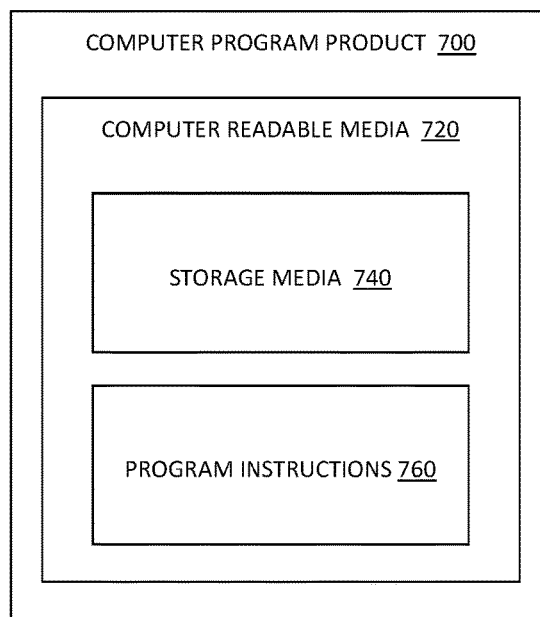
FIG. 7 is a block diagram of a computer program product in accordance with example implementations of the present disclosure.

FIG. 7 is a block diagram of a computer program product 700 in accordance with example implementations of the present disclosure. The computer program product 700 may include computer readable media 720 having storage media 740 and program instructions 760 (i.e., program code) embodied therewith. In example implementations of the present disclosure, the program instructions 760 may be loaded onto memory associated with a system or device of a wireless communications service provider, such as the memory unit 124 of mobile switching center 120 of the network switching subsystem 110 of FIG. 1. The program instructions 760 may be executable by a processor, such as the processing unit 122 of mobile switching center 120 of FIG. 1, to perform a method for communication forwarding in accordance with example implementations of the present disclosure, for example as described above with reference to FIG. 2 and/or FIG. 3. In other example implementations, the program instructions 760 may be loaded onto memory associated with a mobile user device, such as the memory unit 620 of the mobile device 600 of FIG. 6. For example, program instructions 760 may be included within the operating system 622, an application 624, or an update thereof, in memory unit 620 of mobile device 600 of FIG. 6. The program instructions 760 may be executable by a processor, such as the processing unit 610 of mobile device 600 of FIG. 6, to perform methods for communication forwarding in accordance with example implementations of the present disclosure, for example as described above with reference to FIG. 4 and/or FIG. 5.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. A computer implemented method, comprising:
receiving, at a wireless communications provider, a message requesting forwarding of communications from a first user device, wherein the communications include telephone calls, video calls, text based communications, and messages sent via social media, and wherein the message requesting forwarding of communications includes a request message and the communications, and wherein the first user device sends the message requesting the forwarding in response to detecting that a battery on the first user device is reaching or dropping below a predefined threshold level of power;
determining a location of the first user device;
identifying one or more trusted user devices associated with the first user device, wherein the identifying includes determining the trusted user device based on an additional exchange of messages with the first user device, the trusted user of the trusted user device being included in an address book on the first user device, and the trusted user and the trusted user device being obtained from an account associated with a user of the first user device;
selecting a trusted user device to receive forwarded communications for the first user device, wherein the selecting of the trusted user device is based on a parameter indicating a highest predefined priority;
activating the forwarding of communications for the first user device to the selected trusted user device,
wherein forwarding of communications to the trusted user device includes automatically redirecting communications for the first user device to the trusted user device, and providing a message to the sender of a communication to the first user device, the message including details of the trusted user device; and
cancelling the forwarding of communications for the first user device based on detection of a normal battery status, or upon receiving a manual cancellation notification.

2. The method of claim 1, wherein the first user device stores a list of trusted user devices, and wherein a trusted user device is identified based on information included in one or more of: the address book on the first user device, an email account, and social media.

3. The method of claim 2, wherein the message requesting forwarding of communications for the first user device includes a user name associated with the first user device, a most recent location data for the first user device, and a list of contacts for the first user device.

4. The method of claim 1, wherein the selecting a trusted user device comprises:
for each of the identified one or more trusted user devices:
obtaining an identifier for the trusted user device, wherein the identifier is received in the message requesting forwarding, is obtained from the address book on the first user device, or is in the contact list included in the user data associated with the user device;
determining a location of the trusted user device using the identifier;
determining a distance between the location of the trusted user device and the location of the first user device;
comparing the determined distance with a predetermined threshold, and
in response to determining that the trusted user device is located within a predetermined distance of the user device, identifying the trusted user device as a candidate for selection in a subset of trusted user devices.

5. The method of claim 4, wherein the selecting the trusted user device further comprises:
selecting the trusted user device from the candidates for selection that are stored on the first user device, according to a predefined priority associated with a parameter of the trusted user device.

6. The method of claim 5, wherein the parameter of the trusted user device having the highest predefined priority includes the trusted user device that is located the closest to the first user device; the trusted user device having a highest priority value, wherein the priority value of each trusted user device is predefined by the user of the first user device; the trusted user device that had the most recent communication with the first user device; the trusted user device having the longest history of communication with the first user device; the trusted user device having the highest frequency of communication with the first user device over a time period, and a combination thereof.

7. The method of claim 1, wherein, in response to the selecting a trusted user device to receive forwarded communications for the first user device, the method further comprises:
sending a request message to the selected trusted user device, the request message comprising an invitation to the user to accept forwarding of communications for the first user device.

8. The method of claim 7, further comprising:
receiving a response message from the selected trusted user device, wherein:
if the response message includes acceptance of the invitation, activating the forwarding of communications for the first user device to the selected trusted user device, or
if the response message includes rejection of the invitation, selecting a further trusted user device to receive forwarded communications for the first user device.

* * * * *